United States Patent
Yuan et al.

(10) Patent No.: US 12,467,977 B2
(45) Date of Patent: Nov. 11, 2025

(54) ELECTRONIC DEVICE AND BATTERY CAPACITY REPORTING METHOD

(71) Applicant: Getac Technology Corporation, New Taipei (TW)

(72) Inventors: Chen-Kuo Yuan, Taipei (TW); Jen-Hao Cheng, Taipei (TW)

(73) Assignee: Getac Technology Corporation, New Taipei (TW)

( * ) Notice: Subject to any disclaimer, the term of this patent is extended or adjusted under 35 U.S.C. 154(b) by 411 days.

(21) Appl. No.: 18/167,932

(22) Filed: Feb. 13, 2023

(65) Prior Publication Data
US 2024/0175929 A1 May 30, 2024

(30) Foreign Application Priority Data
Nov. 30, 2022 (CN) .......................... 202211535522.2

(51) Int. Cl.
*G01R 31/374* (2019.01)
*G01R 31/3835* (2019.01)
(Continued)

(52) U.S. Cl.
CPC ....... *G01R 31/374* (2019.01); *G01R 31/3835* (2019.01); *H01M 10/425* (2013.01);
(Continued)

(58) Field of Classification Search
USPC .......................................................... 702/63
See application file for complete search history.

(56) References Cited

U.S. PATENT DOCUMENTS

| 5,872,453 A | 2/1999 | Shimoyama et al. |
| 6,157,169 A | 12/2000 | Lee |

(Continued)

FOREIGN PATENT DOCUMENTS

| CN | 109061497 A | 12/2018 |
| CN | 111289906 A | 6/2020 |

(Continued)

OTHER PUBLICATIONS

Diagnosing State of Charge Calculation Jumps (retrieved from the internet on Feb. 16, 2024]<URL:https://web. archive.org/web/20190828042523/http://www.orionbms.com/manuals/pdf/troubleshooting_soc_jumps.pdf> published on Aug. 28, 2019 as per Wayback Machine.

*Primary Examiner* — Paul D Lee
(74) *Attorney, Agent, or Firm* — Troutman Pepper Locke LLP; Tim Tingkang Xia, Esq.

(57) ABSTRACT

An electronic device includes a battery, a battery gauge, and a processor. The battery is configured to supply power to the electronic device. The battery gauge is configured to gauge the battery to generate a plurality of remaining capacities a battery temperature, and a battery voltage of the battery. The processor is configured to sequentially read the plurality of remaining capacities. The processor determines whether a preset condition is met according to the battery temperature and the battery voltage in a case that a read remaining capacity is equal to a cut-off capacity and a read previous remaining capacity is greater than a preset capacity. The processor performs a capacity correction process in a case of determining that the preset condition is met. The capacity correction process includes using the read previous remaining capacity as a correction capacity and reporting the correction capacity to a system circuit.

20 Claims, 6 Drawing Sheets

(51) Int. Cl.
  *H01M 10/42* (2006.01)
  *H01M 10/48* (2006.01)
  *H02J 7/00* (2006.01)

(52) U.S. Cl.
  CPC ......... *H01M 10/486* (2013.01); *H02J 7/0047* (2013.01); *H02J 7/0063* (2013.01); *H01M 2010/4271* (2013.01)

(56) References Cited

U.S. PATENT DOCUMENTS

| | | | |
|---|---|---|---|
| 2007/0216365 A1 | 9/2007 | Sakurai et al. | |
| 2011/0241693 A1* | 10/2011 | Kurata | G01R 31/3842 324/427 |
| 2011/0279094 A1* | 11/2011 | Nakatsuji | G01R 31/367 702/63 |
| 2012/0293132 A1* | 11/2012 | Kaino | H01M 10/44 320/136 |
| 2018/0100899 A1 | 4/2018 | Wu et al. | |
| 2018/0183252 A1 | 6/2018 | Kim et al. | |
| 2022/0131392 A1 | 4/2022 | Isa et al. | |
| 2022/0146585 A1* | 5/2022 | Hong | G01R 31/396 |

FOREIGN PATENT DOCUMENTS

| | | |
|---|---|---|
| CN | 112540313 A | 3/2021 |
| CN | 113359044 A | 9/2021 |
| CN | 114509684 A | 5/2022 |
| CN | 114545266 A | 5/2022 |
| EP | 0713101 A2 | 5/1996 |
| TW | 297098 B | 2/1997 |

* cited by examiner

ELECTRONIC DEVICE AND BATTERY CAPACITY REPORTING METHOD

CROSS-REFERENCE TO RELATED APPLICATION

This non-provisional application claims priority under 35 U.S.C. § 119(a) to Patent Application No. 202211535522.2 filed in China, P.R.C. on Nov. 30, 2022, the entire contents of which are hereby incorporated by reference.

BACKGROUND OF THE INVENTION

The present invention relates to battery capacity reporting, and particularly, to an electronic device applicable in a low temperature environment and a battery capacity reporting method.

Generally, a remaining capacity of a battery is gauged by a battery gauge. Because temperature affects gauging of the remaining capacity, a battery gauge usually compensates for the effect of temperature on the remaining capacity according to a battery algorithm.

For a battery used at a low temperature, battery manufacturers currently set parameters of the battery algorithm according to a single low temperature (for example, set a low temperature to −21 Celsius degrees) and a fixed load when manufacturing batteries. However, in actual use, the low temperature is changeable, for example, is changed to −35 Celsius degrees. In this case, the battery algorithm will not be sufficient, and the remaining capacity of the battery will jump abnormally (%), for example, the remaining capacity jumps directly from 50% to 0%. As a result, a power supply duration of the battery is greatly shortened, and even an electronic device using the battery will be powered off instantaneously and cannot be powered on for use.

SUMMARY OF THE INVENTION

In an embodiment, the present invention provides an electronic device. The electronic device includes a battery, a battery gauge, and a processor. The battery is configured to supply power to the electronic device. The battery gauge is configured to gauge the battery to generate a plurality of remaining capacities, a battery temperature, and a battery voltage of the battery. The processor is configured to sequentially read the plurality of remaining capacities. The processor determines whether a preset condition is met according to the battery temperature and the battery voltage in a case that a read remaining capacity is equal to a cut-off capacity and a read previous remaining capacity is greater than a preset capacity. The processor performs a capacity correction process in a case of determining that the preset condition is met. The capacity correction process includes using the read previous remaining capacity as a correction capacity and reporting the correction capacity to a system circuit.

In an embodiment, the present invention provides a battery capacity reporting method. The battery capacity reporting method includes: sequentially reading a plurality of remaining capacities generated by gauging a battery by a battery gauge; determining whether a preset condition is met according to a battery temperature and a battery voltage of the battery in a case that a read remaining capacity is equal to a cut-off capacity and a read previous remaining capacity is greater than a preset capacity; and performing a capacity correction process in a case of determining that the preset condition is met. The capacity correction process includes using the read previous remaining capacity as a correction capacity and reporting the correction capacity to a system circuit.

In summary, for the electronic device and the battery capacity reporting method in any embodiment, when a battery algorithm is not sufficient due to a low temperature to cause display (or reporting) of a capacity of the battery to jump abnormally, the capacity correction process is performed to generate and report the correction capacity to the system circuit, so that a power supply duration of the electronic device can be maintained normally and is not shortened due to abnormal jumping. In addition, the electronic device implemented according to the battery capacity reporting method in any embodiment can display the capacity of the battery to a user according to the correction capacity, so that the user will not see an abnormally jumped capacity of the battery, thereby improving user experience.

Detailed features and advantages of the present invention are described in detail in the following implementations, and the content of the implementations is sufficient for a person skilled in the art to understand and implement the technical content of the present invention. A person skilled in the art can easily understand the objectives and advantages related to the present invention according to the contents disclosed in this specification, the claims and the drawings.

DETAILED DESCRIPTION OF THE INVENTION

To make the objectives, features, and advantages of the embodiments of the present invention more comprehensible, the following provides detailed descriptions with reference to the accompanying drawings.

It should be understood that terms such as "include" in the specification are used to indicate the presence of particular technical features, values, method steps, job processing, elements, and/or components, but do not exclude the addition of more other technical features, values, method steps, job processing, elements, components, or any combination thereof.

Figure 1:
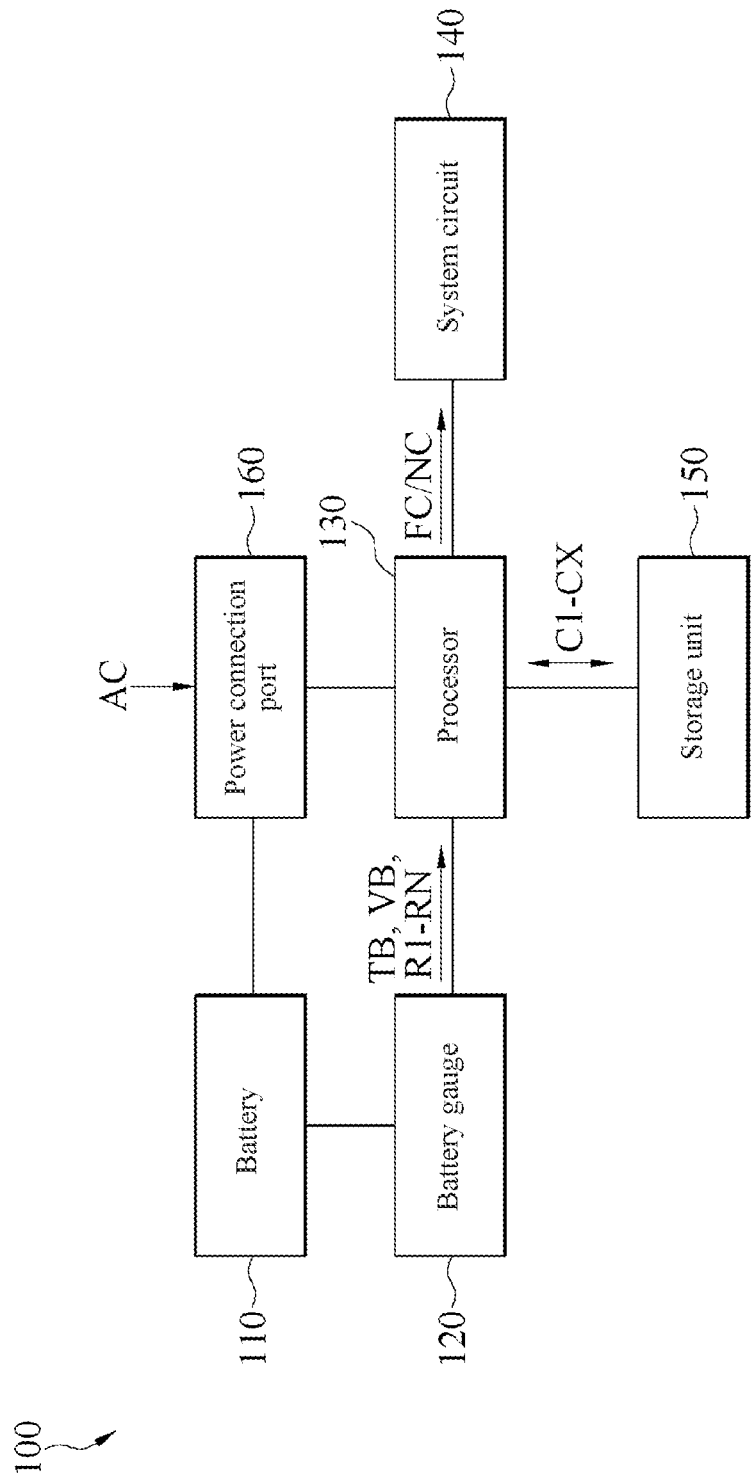
FIG. 1 is a schematic block diagram of an embodiment of an electronic device.

FIG. 1 is a schematic block diagram of an embodiment of an electronic device; Refer to FIG. 1. An electronic device 100 includes a battery 110, a battery gauge 120, and a processor 130. The battery gauge 120 is coupled to a battery cell in the battery 110, and the processor 130 is coupled to the battery gauge 120. In addition, the electronic device 100 further includes a system circuit 140 and a storage unit 150, and the processor 130 is coupled to the system circuit 140 and the storage unit 150.

The battery 110 stores power through the battery cell, and is configured to supply stored power to the electronic device 100. In some implementation aspects, the battery 110 may be a lithium-ion battery, a lithium phosphate battery, a lithium polymer battery, a nickel-cadmium battery, a lead-acid battery, or any other type of battery suitable for secondary charging.

The battery gauge 120 is configured to gauge battery properties of the battery 110, such as remaining capacities R1 to RN, a battery temperature TB, and a battery voltage VB, and output gauging results to the processor 130. The battery gauge 120 may repeatedly gauge the battery 110 with a gauging frequency to sequentially generate the plurality of remaining capacities R1 to RN, the battery temperature TB, and the battery voltage VB of the battery cell, where N is a positive integer greater than 1.

In some embodiments, the battery gauge 120 and the battery cell may be arranged in a housing (not shown) of the battery 110, and the battery gauge 120 may obtain the battery temperature TB by sensing an internal ambient temperature in the housing of the battery 110 (for example, sense and generate a corresponding temperature by a temperature detecting unit). However, the present invention is not limited thereto. The battery gauge 120 may also obtain the battery temperature TB through the battery cell electrically connected to the battery 110. In addition, the battery gauge 120 may obtain the remaining capacities R1 to RN of the battery 110 using the open circuit voltage method or the coulomb counting method, and the remaining capacities R1 to RN may be represented as a relative state of capacity (RSOC) to indicate an amount of power currently stored in the battery 110. In some implementation aspects, a gauge integrated circuit (gauge IC) may be used as the battery gauge 120 for implementation, but the present invention is not limited thereto.

The processor 130 is configured to sequentially read the plurality of remaining capacities R1 to RN generated by the battery gauge 120, and report a corresponding battery capacity FC to the system circuit 140 according to each of the remaining capacities R1 to RN. In some embodiments, the system circuit 140 may be configured to perform a corresponding operation according to the battery capacity FC reported by the processor 130. For example, the electronic device 100 is caused to display the battery capacity FC reported by the processor 130 on a display screen (not shown) of the electronic device to a user.

In some implementation aspects, an embedded controller (EC), a system-on-chip (SoC), a central processing unit (CPU), a microcontroller unit (MCU), an application-specific integrated circuit (ASIC), an application processor (AP), a digital signal processor (DSP), a programmable logic device (PLD), or any other suitable electronic device may be used as the processor 130 for implementation. The system circuit 140 may include at least an operating system (OS). In addition, one or more storage elements may be used as the storage unit 150 for implementation, and each storage element may be, but is not limited to, a non-volatile memory, such as a read-only memory (ROM) or a flash memory, or a volatile memory, such as a random access memory (RAM).

It is worth noting that, to clearly illustrate the present invention, FIG. 1 is a simplified block diagram showing only elements relevant to the present invention. For those with ordinary knowledge in the technical field of the present invention, it should be understood that the electronic device 100 may also include other elements for providing other specific functions (such as, display, sound, and the like).

In some embodiments, the electronic device 100 may use the processor 130 to perform the battery capacity reporting method in any embodiment, so that when the electronic device 100 is used in a low temperature environment, capacity display (or reporting) of the battery 110 (that is, a display value or a reporting value representing a total amount of power currently stored in all battery cells of the battery 110) does not jump abnormally (%) (that is, the battery capacity displayed or reported does not decrease progressively but abruptly jumps from a value to another value) because the battery algorithm is not sufficient. In this way, when the electronic device 100 is used in a low temperature environment, a power supply duration for which the battery 110 supplies power to the electronic device 100 can be kept normal and will not be shortened due to abnormal jumping. In addition, because the electronic device 100 can display a capacity of the battery 110 to the user according to a correction capacity generated using the battery capacity reporting method in any embodiment, the user will not see an abnormally jumped capacity of the battery 110, thereby improving user experience.

Figure 2:
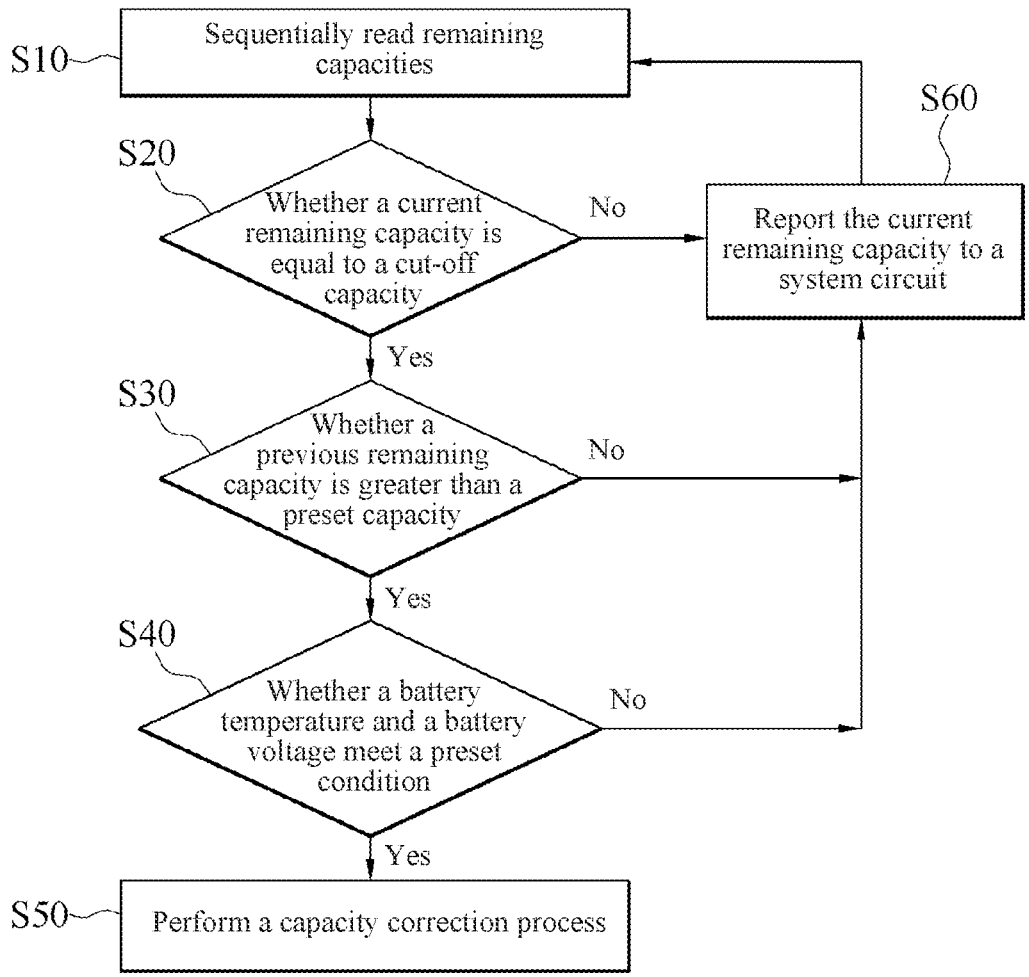
FIG. 2 is a schematic flowchart of an embodiment of a battery capacity reporting method.

FIG. 2 is a schematic flowchart of an embodiment of a battery capacity reporting method. Refer to FIG. 1 and FIG. 2. In an embodiment of the battery capacity reporting method, the electronic device 100 can sequentially read the remaining capacities R1 to RN outputted by the battery gauge 120 through the processor 130 (step S10).

In an embodiment of step S10, the processor 130 may receive the plurality of remaining capacities R1 to RN generated by the battery gauge 120 with a reading frequency. Then, the processor 130 may first perform data filtering on the remaining capacities R1 to RN and temporarily store, in the storage unit 150, remaining capacities C1 to CX after filtering out dirty data, where X is a positive integer greater than 1 and less than or equal to N. In addition, each of the remaining capacities C1 to CX is one of the remaining capacities R1 to RN. Then, the processor 130 sequentially reads the remaining capacities C1 to CX from the storage unit 150, and reports a battery capacity FC of the battery to the system circuit 140 according to each of the remaining capacities C1 to CX with a reporting frequency. In some implementation aspects, the reporting frequency is less than the reading frequency. The reading frequency may be, for example, but is not limited to, once per second.

After the processor 130 reads a remaining capacity from the storage unit 150 in step S10, the processor 130 first determines whether the current remaining capacity is equal to a cut-off capacity (step S20). In some implementation aspects, the cut-off capacity may be, for example, but is not limited to, 0%.

In a case that the processor 130 determines that the current remaining capacity (using a remaining capacity C1 as an example) is not equal to the cut-off capacity, the processor 130 directly reports the current remaining capacity C1 to the system circuit 140 (step S60), and returns to step S10 to read a next remaining capacity (using a remaining capacity C2 as an example) from the storage unit 150 and continue determining the next remaining capacity C2.

By analogy, until determining of a remaining capacity, such as a remaining capacity C8, in a case that the processor 130 determines that the remaining capacity C8 is equal to the cut-off capacity, the processor 130 further determines whether a previous remaining capacity, namely, a remaining capacity C7 is greater than a preset capacity (step S30) to determine whether there is a situation of jumping in the battery cell of the battery 110. In some implementation aspects, the preset capacity may be, but is not limited to, 1%.

In a case that a determination result of the processor 130 in step S30 is that the remaining capacity C7 is less than or equal to the preset capacity (for example, the remaining capacity C7 is 1% and equal to the preset capacity), it means that the battery 110 is normally discharged to the cut-off capacity without jumping. In this case, the processor 130 performs step S60 to report the current remaining capacity C8 to the system circuit 140.

In a case that a determination result of the processor 130 in step S30 is that the remaining capacity C7 is greater than the preset capacity (for example, the remaining capacity C7 is 50% and greater than the preset capacity), it means that there is a situation of jumping in the capacity of the battery 110. In this case, the processor 130 further determines whether a preset condition is met according to the battery temperature TB and the battery voltage VB (step S40). In some embodiments, the preset condition is that the battery temperature TB is less than a temperature threshold and the battery voltage VB is greater than a voltage threshold. In some implementation aspects, the temperature threshold may be 0 Celsius degrees or other temperatures suitable for representing a low temperature, and the voltage threshold may be 3.1 volts or other voltage values suitable for representing a situation that the battery 110 is dead.

In a case that a determination result of the processor 130 in step S40 is that the preset condition is not met, for example, the processor 130 determines in step S40 that the battery temperature TB is greater than the temperature threshold (that is, it means that the battery 110 is not at a low temperature) and/or the battery voltage VB is less than or equal to the voltage threshold (it means that the battery 110 is really dead), the processor 130 performs step S60 to report the current remaining capacity C8 to the system circuit 140.

In a case that a determination result of the processor 130 in step S40 is that the preset condition is met, it means that the battery 110 with jumping is in a low temperature environment and remaining power still actually exists in the battery 110. To enable the battery 110 to completely supply power stored in the battery to the electronic device 100, the processor 130 does not report the current remaining capacity C8 to the system circuit 140 and performs a capacity correction process (step S50).

Figure 3:
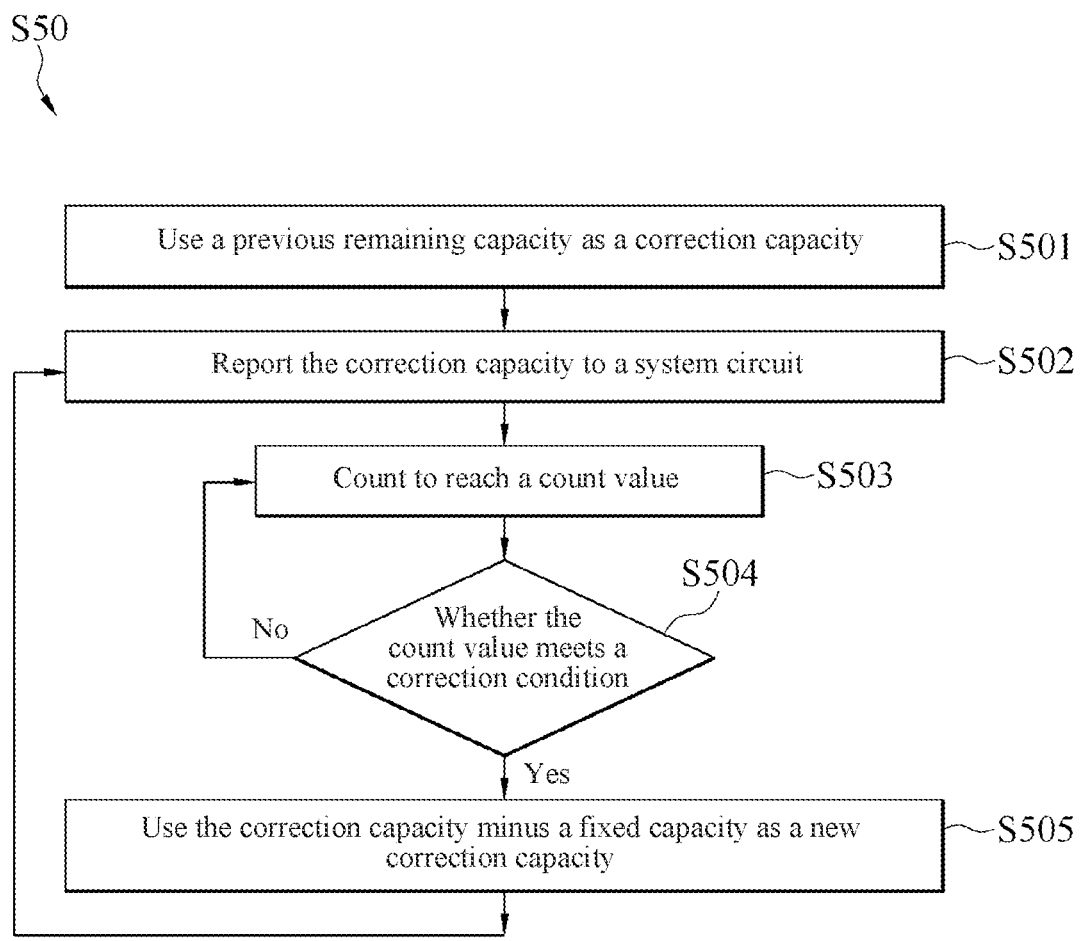
FIG. 3 is a schematic flowchart of an embodiment of a capacity correction process.

FIG. 3 is a schematic flowchart of an embodiment of a capacity correction process. Refer to FIG. 1 and FIG. 3. In an embodiment of capacity correction process, the processor 130 uses the previous remaining capacity C7 of, for example, 50% as a correction capacity NC (step S501), and reports the correction capacity NC to the system circuit 140 (step S502). After reporting the correction capacity NC to the system circuit 140, the processor 130 starts counting to reach a count value (step S503), and determines whether the count value meets a correction condition (step S504). In a case of determining that the count value meets the correction condition, the processor 130 uses the current correction capacity NC minus a fixed capacity as a new correction capacity NC (step S505), and returns to perform step S502 to report the updated correction capacity NC to the system circuit 140.

In some embodiments, the correction condition may depend on a maximum capacity of the battery 110. In some implementation aspects, in a case that the maximum capacity of the battery 110 is greater than 8000 milliampere hours (mAh), the correction condition may be, for example, but is not limited to, that the count value is equal to an integer multiple of 40. In a case that the maximum capacity of the battery 110 is less than or equal to 8000 mAh, the correction condition may be, for example, but is not limited to, that the count value is equal to an integer multiple of 20. In addition, the fixed capacity may be, for example, but is not limited to, 1%.

In some embodiments, after performing step S505 and returning to sequentially perform step S502 and step S503, the count value may not return to zero and continue to accumulate. However, the present invention is not limited thereto. In some other embodiments, after performing step S505, the count value returns to zero. Therefore, when subsequently returning to sequentially perform step S502 and step S503, the count value starts accumulating from zero.

The maximum capacity of the battery 110 being greater than 8000 mAh is used as an example to describe step S501 to step S505. After using 50% as the correction capacity NC and reporting the correction capacity NC to the system circuit 140, the processor 130 starts counting from zero. When the count value reaches 40, the processor 130 deducts the fixed capacity of 1% from the correction capacity NC of 50% and reports a correction capacity NC of 49% (namely, a new correction capacity NC) to the system circuit 140. Then, the counting continues (assuming that the count value does not return to zero) until the count value reaches 80, and then the processor 130 deducts the fixed capacity of 1% from the correction capacity NC of 49% and reports a correction capacity NC of 48% (namely, a new correction capacity NC) to the system circuit 140. This process may continue subsequently and therefore details are not described again.

Figure 4:
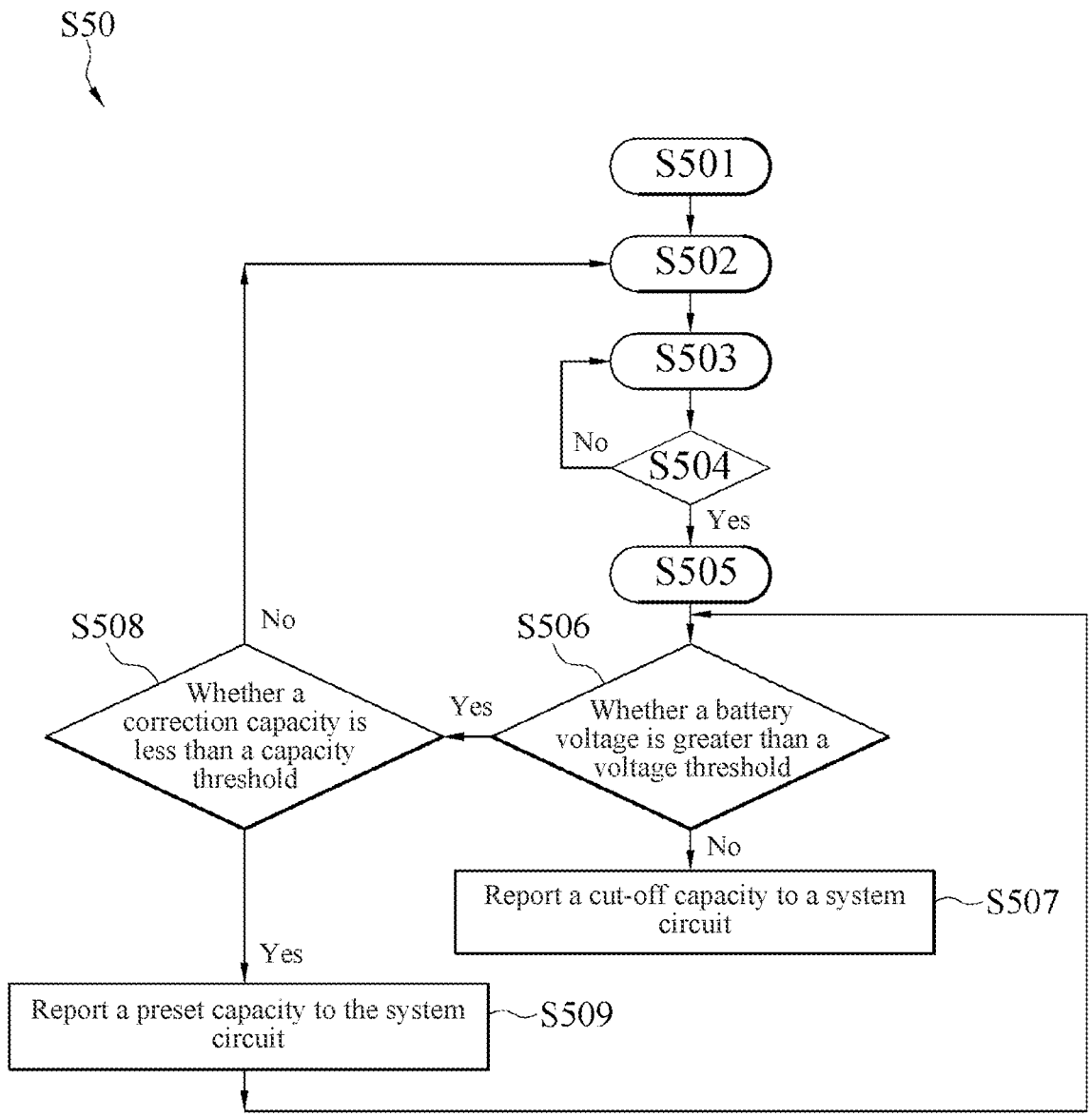
FIG. 4 is a schematic flowchart of an embodiment of a capacity correction process.

FIG. 4 is a schematic flowchart of an embodiment of a capacity correction process. Refer to FIG. 1 and FIG. 4. In an embodiment of the capacity correction process, after the new correction capacity NC is obtained in step S505, the processor 130 may first read the battery voltage from the battery gauge 120 and determine whether the battery voltage VB is greater than the voltage threshold (step S506) to determine whether there is remaining power in the battery 110. In some implementation aspects, the voltage threshold may be 3.1 volts or other voltage values suitable for representing a situation that the battery 110 is dead.

In a case of determining that the battery voltage VB is not greater than the voltage threshold (that is, less than or equal to the voltage threshold), it means that there is no power in the battery 110 to be supplied to the electronic device 100. Therefore, the processor 130 reports a cut-off capacity to the system circuit 140 (step S507).

In some embodiments, the processor 130 performs step S507 only after it is continuously recorded that a number of times that the battery voltage VB is not greater than the voltage threshold reaches a predetermined number of times. In a case that the number of times that the battery voltage VB is not greater than the voltage threshold has not reached the predetermined number of times, the processor 130 may return to perform step S506 to re-determine whether the battery voltage VB is not greater than the voltage threshold. In some implementation aspects, the cut-off capacity may be, for example, but is not limited to, 0%. In addition, the predetermined number of times may be, but is not limited to, 10.

In some embodiments, after performing step S507 to report the cut-off capacity to the system circuit 140, the processor 130 may finish (jump out of) the capacity correction process. In addition, the system circuit 140 may perform a shutdown operation after receiving the cut-off capacity reported by the processor 130 to ensure that the electronic device 100 is normally shut down.

In a case of determining that the battery voltage VB is greater than the voltage threshold in step S506, the processor 130 continues to determine whether the new correction capacity NC is less than a capacity threshold (step S508). In some implementation aspects, the capacity threshold may be, but is not limited to, 1% or 3%. In a case of determining that the new correction capacity NC is not less than the capacity threshold, the processor 130 performs step S502 to report the correction capacity NC to the system circuit 140. In a case of determining that the new correction capacity NC is less than the capacity threshold, the processor 130 reports a preset capacity to the system circuit 140 instead, so that the electronic device 100 can keep operating without shutting down (step S509). In some implementation aspects, the preset capacity may be 1%, 3%, or any other minimum capacity suitable to keep the electronic device 100 operating without shutting down.

Figure 5:
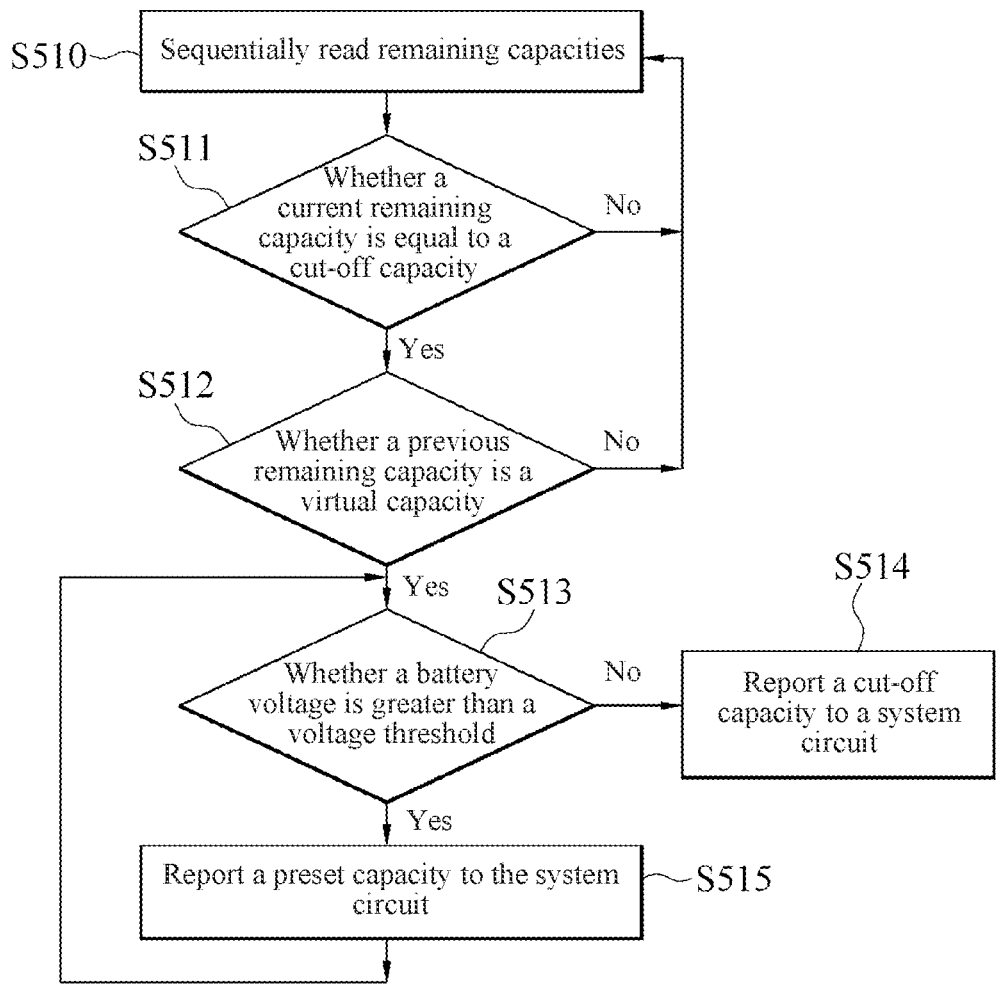
FIG. 5 is a schematic flowchart of an embodiment of a partial capacity correction process.

FIG. 5 is a schematic flowchart of an embodiment of a partial capacity correction process. Refer to FIG. 1 to FIG. 5. In an embodiment of the capacity correction process, the processor 130 may further sequentially read the remaining capacities C1 to CX from the storage unit 150 (step S510). In an embodiment of step S510, the processor 130 reads a next remaining capacity following a reading sequence of step S10, such as a remaining capacity C9. After reading a remaining capacity from the storage unit 150 in step S510, the processor 130 determines whether the current remaining capacity is equal to a cut-off capacity (step S511). In some implementation aspects, the cut-off capacity may be, for example, but is not limited to, 0%.

In a case that the processor 130 determines that the current remaining capacity is not equal to the cut-off capacity in step S511, the processor 130 returns to perform step S510 to read a next remaining capacity. In a case that the processor 130 determines that the current remaining capacity, for example, a remaining capacity C20 is equal to the cut-off capacity in step S511, the processor 130 further determines whether a previous remaining capacity, namely, a remaining capacity C19 is a virtual capacity (step S512). In some embodiments, the virtual capacity is a capacity value that is automatically generated and recorded in the storage unit 150 when the processor 130 detects that the battery gauge 120 suddenly fails to output a remaining capacity (for example, because the user replaces the battery 110). In some implementation aspects, the virtual capacity may be, for example, 100%, but the present invention is not limited thereto. The virtual capacity may be any capacity value for preventing the electronic device 100 from being powered off instantaneously.

In a case that the processor 130 determines that the previous remaining capacity C19 is not the virtual capacity in step S512, the processor 130 returns to perform step S510 to read a next remaining capacity. In a case that the processor 130 determines that the previous remaining capacity C19 is the virtual capacity in step S512, it means that there has been a situation of jumping in the battery 110 and the battery has been replaced with another battery. In this case, the processor 130 reads a battery voltage VB currently outputted by the battery gauge 120 to determine whether the battery voltage VB is greater than the voltage threshold (step S513).

In a case that the processor 130 determines that the battery voltage VB is not greater than the voltage threshold in step S513, it means that there is exactly no power in a new battery 110 to be supplied to the electronic device 100 (that is, the user obtains a dead battery 110 through replacement), and therefore, the processor 130 reports a cut-off capacity to the system circuit 140 (step S514).

In a case that the processor 130 determines that the battery voltage VB is greater than the voltage threshold in step S513, it means that there is still remaining power in the new battery 110, and therefore, the processor 130 reports a preset capacity to the system circuit 140, so that the electronic device 100 can keep operating without shutting down (step S515). In some implementation aspects, the preset capacity may be 1%, 3%, or any other minimum capacity suitable to keep the electronic device 100 operating without shutting down.

In some embodiments, after performing step S515, the processor 130 returns to perform step S513 to re-determine whether the current battery voltage VB is still greater than the voltage threshold. In a case that the processor 130 determines that the battery voltage VB is not greater than the voltage threshold in step S513, it means that the remaining power in the new battery 110 is exhausted. In this case, the processor 130 performs step S514 to report the cut-off capacity to the system circuit 140 instead.

In some embodiments, the processor 130 performs step S514 only after it is continuously recorded that a number of times that the battery voltage VB is not greater than the voltage threshold reaches a predetermined number of times. In a case that the number of times that the battery voltage VB is not greater than the voltage threshold has not reached the predetermined number of times, the processor 130 may return to perform step S513 to repeatedly determine whether the battery voltage VB is not greater than the voltage threshold. In some implementation aspects, the cut-off capacity may be, for example, but is not limited to, 0%. In addition, the predetermined number of times may be, but is not limited to, 10.

In some embodiments, after performing step S514 to report the cut-off capacity to the system circuit 140, the processor 130 may finish (jump out of) the capacity correction process. In addition, the system circuit 140 may perform a shutdown operation after receiving the cut-off capacity reported by the processor 130 to ensure that the electronic device 100 is normally shut down.

In some embodiments, in determining of step S513, the processor 130 does not perform relevant steps of reporting the correction capacity NC to the system circuit 140 (that is, steps S501 to S509).

In some embodiments, as shown in FIG. 1, the electronic device 100 further includes a power connection port 160, and the power connection port 160 is coupled to the battery 110 and the processor 130. The power connection port 160 is configured to be connected to a corresponding power connector to receive a power input AC through the power connector. The power connector may be connected to or detached from the power connection port 160 in a pluggable manner. In some implementation aspects, the power input AC may be the mains supply.

Figure 6:
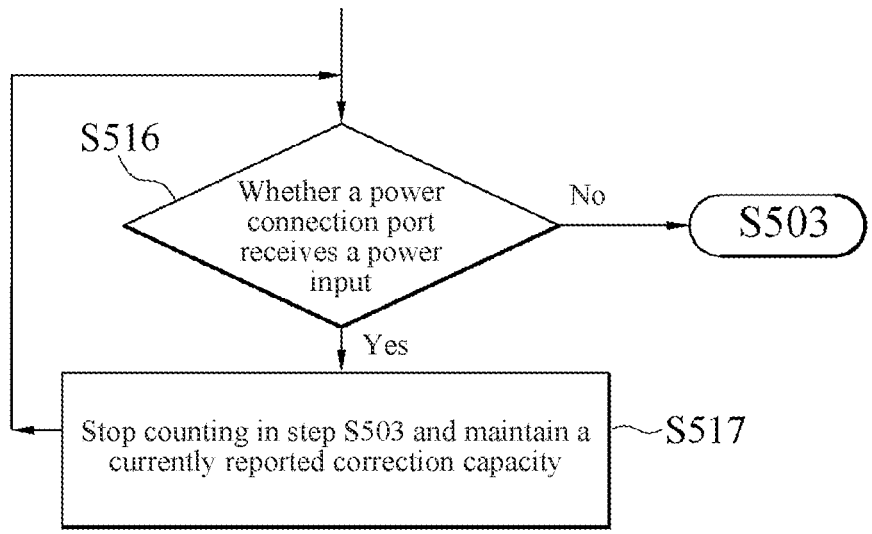
FIG. 6 is a schematic flowchart of an embodiment of a partial capacity correction process.

FIG. 6 is a schematic flowchart of an embodiment of a partial capacity correction process. Refer to FIG. 1 to FIG. 6. In an embodiment of the capacity correction process, the processor 130 may further detect whether the power connection port 160 receives the power input AC (step S516). In a case of detecting that the power connection port 160 receives the power input AC, it means that the electronic device 100 may directly use the power input AC to operate without consuming power in the battery 110. Therefore, the processor 130 stops counting (that is, interrupts performing step S503) and maintains the value of the currently reported correction capacity and the count value in step S503 (step S517). It should be noted that, the battery 110 is not charged with the power input AC (because the battery temperature TB is less than the temperature threshold).

After stopping counting, the processor 130 may return to perform step S516 to re-determine whether the power connection port 160 still receives the power input AC. In a case that the processor 130 detects that the power connection port 160 does not receive the power input AC after performing step S517 and stopping counting, the processor 130 returns to perform step S503 to start counting following a previous count value.

Figure 7:
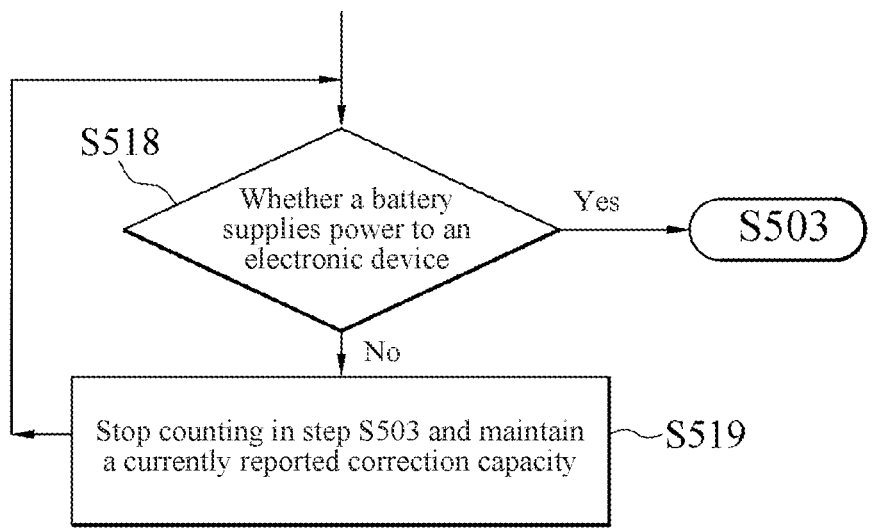
FIG. 7 is a schematic flowchart of an embodiment of a partial capacity correction process.

In some embodiments, a number of batteries 110 of the electronic device 100 may be more than one, and a number of battery gauges 120 may correspond to the number of the batteries 110. The battery capacity reporting method in any embodiment of the present invention may also be applicable to an electronic device 100 with more than one battery 110 (that is, an electronic device 100 with a multi-battery architecture). In the multi-battery architecture, a processor 130 of the electronic device 100 performs the battery capacity reporting method in any embodiment of the present invention for each battery 110. FIG. 7 is a schematic flowchart of an embodiment of a partial capacity correction process. Refer to FIG. 1 to FIG. 7.

In the multi-battery architecture, the electronic device 100 is powered by a battery 110 with a relatively high current remaining capacity and other batteries 110 do not supply power. Therefore, in an embodiment of the battery capacity reporting method applicable to the electronic device 100 with a multi-battery architecture, the processor 130 further detects each battery 110 in the capacity correction process to determine whether each battery supplies power (discharges) to the electronic device 100 (step S518). In detection of each battery 110, in a case of detecting that the battery 110 does not supply power to the electronic device 100 (it means that a current remaining capacity of the battery 110 is not the highest), the processor 130 stops counting for the battery 110 (that is, interrupting step S503 performed for the battery 110) and maintain a value of the currently reported correction capacity NC for the battery 110 and the count value in step S503 (step S519). Only in a case of detecting that the battery 110 resumes supplying power to the electronic device 100 (it means that the current remaining capacity of the battery 110 is the highest), the processor 130 resumes performing step S503 for the battery 110 to start counting following the previous count value.

In the following, an electronic device 100 with two batteries 110 (referred to as a first battery and a second battery respectively below) is used as an example for description. Assuming that a current correction capacity NC of the first battery is 80% and a current correction capacity NC of the second battery is 60%, the first battery first supplies power and the second battery does not supply power. In this case, for the first battery, the processor 130 counts to reach a first count value, deducts a fixed capacity (for example, 1%) from the current correction capacity NC of 80% in a case that the first count value meets a first correction condition (for example, the first count value is equal to an integer multiple of 40), and then reports a new correction capacity NC, namely, 79% to the system circuit 140. For the second battery, the processor 130 stops counting and keeps reporting the current correction capacity NC, namely, 60% to the system circuit 140. In a case that the current correction capacity NC of the first battery is changed to, for example, 59% less than the current correction capacity NC of the second battery, the second battery supplies power instead, and the first battery does not supply power. In this case, for the first battery, the processor 130 stops counting to reach the first count value (the first count value before stopping is not cleared) and keeps reporting the current correction capacity NC, namely, 59% to the system circuit 140. For the second battery, the processor 130 counts to reach a second count value, deducts the fixed capacity (for example, 1%) from the current correction capacity NC of 60% in a case that the second count value meets a second correction condition (for example, the second count value is equal to an integer multiple of 40), and then reports a new correction capacity NC, namely, 59% to the system circuit 140. A subsequent process may be deduced by analogy, and therefore details are not described again.

In some embodiments, in the capacity correction process, the processor 130 may read the battery temperature TB of the battery 110 at regular intervals (or continuously). In addition, as long as the processor 130 reads the battery temperature TB greater than the temperature threshold, the processor 130 finishes the capacity correction process, and resumes reporting to the system circuit 140 according to the remaining capacities R1 to RN generated by the battery gauge 120.

In some embodiments, the battery capacity reporting method in any embodiment of the present invention may be implemented by a readable recording media apparatus. The readable recording media apparatus stores a plurality of program codes, and after the processor 130 of the electronic device 100 loads and executes the plurality of program codes, the program codes can enable the processor 130 of the electronic device 100 to perform the battery capacity reporting method in any embodiment of the present invention. In an embodiment, the readable recording media apparatus may be the storage unit 150 in the electronic device 100, and the storage unit 150 may further be configured to store any data required to perform the battery capacity reporting method, such as the fixed capacity, the preset capacity, and the like. In another embodiment, the readable recording media apparatus may be a distal-end storage element, and communicate with the processor 130 of the electronic device 100 in a wired or wireless manner. In still another embodiment, the readable recording media apparatus may be a storage element outside the electronic device 100, and the program codes of the storage element are connected and accessed by a reader or connector of the electronic device 100.

In summary, for the electronic device 100 and the battery capacity reporting method in any embodiment, when a battery algorithm is not sufficient due to a low temperature to cause display (or reporting) of the capacity of the battery 110 to jump abnormally, the capacity correction process is performed to generate and report the correction capacity NC to the system circuit 140, so that a power supply duration of the electronic device 100 can be maintained normally and is not shortened due to abnormal jumping. In addition, the electronic device 100 implemented according to the battery capacity reporting method in any embodiment can display a capacity of the battery 110 to a user according to the correction capacity NC, so that the user will not see an abnormally jumped capacity of the battery 110, thereby improving user experience.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An electronic device, comprising:
a battery, configured to supply power to the electronic device;
a battery gauge, configured to gauge the battery to generate a plurality of remaining capacities, a battery temperature, and a battery voltage of the battery; and
a processor, configured to sequentially read the plurality of remaining capacities, wherein in a case that a read remaining capacity is equal to a cut-off capacity and a read previous remaining capacity is greater than a preset capacity, the processor determines whether a preset condition is met according to the battery temperature and the battery voltage, wherein in a case of determining that the preset condition is met, the processor performs a capacity correction process, wherein the capacity correction process comprises:
using the read previous remaining capacity as a correction capacity;
reporting the correction capacity to a system circuit;
starting counting to reach a count value, after the step of reporting the correction capacity to the system circuit;
using the correction capacity minus a fixed capacity as a new correction capacity in a case that the count value meets a correction condition, and returning to perform the step of reporting the correction capacity to the system circuit;
stopping counting in a case of detecting that the battery fails to supply power to the electronic device, and maintaining the correction capacity reported to the system circuit; and
continuing counting in a case of detecting that the battery resumes supplying power to the electronic device.

2. The electronic device according to claim 1, wherein the preset condition is that the battery temperature is less than a temperature threshold and the battery voltage is greater than a voltage threshold.

3. The electronic device according to claim 1, wherein in a case that the preset condition is not met, in a case that the read remaining capacity is not equal to the cut-off capacity, or in a case that the read remaining capacity is equal to the cut-off capacity and the read previous remaining capacity is less than or equal to the preset capacity, the processor reports the current remaining capacity to the system circuit.

4. The electronic device according to claim 1, wherein the capacity correction process further comprises:
determining whether the battery voltage is greater than a voltage threshold after obtaining the new correction capacity;
determining whether the new correction capacity is less than a capacity threshold in a case of determining that the battery voltage is greater than the voltage threshold;
performing the step of reporting the correction capacity to a system circuit in a case of determining that the new correction capacity is not less than the capacity threshold;
reporting the preset capacity to the system circuit in a case of determining that the new correction capacity is less than the capacity threshold; and
reporting the cut-off capacity to the system circuit in a case of determining that the battery voltage is not greater than the voltage threshold.

5. The electronic device according to claim 4, wherein the step of reporting the cut-off capacity to the system circuit is performed after it is continuously recorded that a number of times that the battery voltage is not greater than the voltage threshold reaches a predetermined number of times.

6. The electronic device according to claim 1, wherein the capacity correction process further comprises:
sequentially reading the plurality of remaining capacities;
determining whether the battery voltage is greater than a voltage threshold in a case that the read remaining capacity is the cut-off capacity and the read previous remaining capacity is a virtual capacity;
reporting the cut-off capacity to the system circuit in a case of determining that the battery voltage is not greater than the voltage threshold; and
reporting the preset capacity to the system circuit in a case of determining that the battery voltage is greater than the voltage threshold, and returning to the step of determining whether the battery voltage is greater than a voltage threshold.

7. The electronic device according to claim 6, wherein the step of reporting the cut-off capacity to the system circuit is performed after it is continuously recorded that a number of times that the battery voltage is not greater than the voltage threshold reaches a predetermined number of times.

8. A battery capacity reporting method, comprising:
sequentially reading a plurality of remaining capacities generated by gauging a battery by a battery gauge;
determining whether a preset condition is met according to a battery temperature and a battery voltage of the battery in a case that a read remaining capacity is equal to a cut-off capacity and a read previous remaining capacity is greater than a preset capacity; and
performing a capacity correction process in a case of determining that the preset condition is met, wherein the capacity correction process comprises:
using the read previous remaining capacity as a correction capacity; and
reporting the correction capacity to a system circuit;
starting counting to reach a count value, after the step of reporting the correction capacity to the system circuit;
using the correction capacity minus a fixed capacity as a new correction capacity in a case that the count value meets a correction condition, and returning to perform the step of reporting the correction capacity to the system circuit;
stopping counting in a case of detecting that the battery fails to supply power, and maintaining the correction capacity reported to the system circuit; and
continuing counting in a case of detecting that the battery resumes supplying power.

9. The battery capacity reporting method according to claim 8, wherein the preset condition is that the battery temperature is less than a temperature threshold and the battery voltage is greater than a voltage threshold.

10. The battery capacity reporting method according to claim 8, further comprising:
reporting the current remaining capacity to the system circuit, in a case that the preset condition is not met, in a case that the read remaining capacity is not equal to the cut-off capacity, or in a case that the read remaining capacity is equal to the cut-off capacity and the read previous remaining capacity is less than or equal to the preset capacity.

11. The battery capacity reporting method according to claim 8, wherein the capacity correction process further comprises:

determining whether the battery voltage is greater than a voltage threshold after obtaining the new correction capacity;

determining whether the new correction capacity is less than a capacity threshold in a case of determining that the battery voltage is greater than the voltage threshold;

performing the step of reporting the correction capacity to a system circuit in a case of determining that the new correction capacity is not less than the capacity threshold;

reporting the preset capacity to the system circuit in a case of determining that the new correction capacity is less than the capacity threshold; and reporting the cut-off capacity to the system circuit in a case of determining that the battery voltage is not greater than the voltage threshold.

12. The battery capacity reporting method according to claim 11, wherein the step of reporting the cut-off capacity to the system circuit is performed after it is continuously recorded that a number of times that the battery voltage is not greater than the voltage threshold reaches a predetermined number of times.

13. The battery capacity reporting method according to claim 8, wherein the capacity correction process further comprises:

sequentially reading the plurality of remaining capacities;

determining whether the battery voltage is greater than a voltage threshold in a case that the read remaining capacity is the cut-off capacity and the read previous remaining capacity is a virtual capacity;

reporting the cut-off capacity to the system circuit in a case of determining that the battery voltage is not greater than the voltage threshold; and reporting the preset capacity to the system circuit in a case of determining that the battery voltage is greater than the voltage threshold, and returning to the step of determining whether the battery voltage is greater than a voltage threshold.

14. The battery capacity reporting method according to claim 13, wherein the step of reporting the cut-off capacity to the system circuit is performed after it is continuously recorded that a number of times that the battery voltage is not greater than the voltage threshold reaches a predetermined number of times.

15. An electronic device, comprising:

a battery, configured to supply power to the electronic device;

a battery gauge, configured to gauge the battery to generate a plurality of remaining capacities, a battery temperature, and a battery voltage of the battery;

a power connection port, coupled to the battery and configured to receive a power input; and a processor, configured to sequentially read the plurality of remaining capacities and to detect whether the power connection port receives the power input, wherein in a case that a read remaining capacity is equal to a cut-off capacity and a read previous remaining capacity is greater than a preset capacity, the processor determines whether a preset condition is met according to the battery temperature and the battery voltage, wherein in a case of determining that the preset condition is met, the processor performs a capacity correction process, wherein the capacity correction process comprises:

using the read previous remaining capacity as a correction capacity;

reporting the correction capacity to a system circuit;

starting counting to reach a count value, after the step of reporting the correction capacity to the system circuit;

using the correction capacity minus a fixed capacity as a new correction capacity in a case that the count value meets a correction condition, and returning to perform the step of reporting the correction capacity to a system circuit;

stopping counting in a case of detecting that the power connection port receives the power input; and continuing counting in a case of detecting that the power connection port fails to receive the power input after the stopping counting.

16. The electronic device according to claim 15, wherein the preset condition is that the battery temperature is less than a temperature threshold and the battery voltage is greater than a voltage threshold.

17. The electronic device according to claim 15, wherein in a case that the preset condition is not met, in a case that the read remaining capacity is not equal to the cut-off capacity, or in a case that the read remaining capacity is equal to the cut-off capacity and the read previous remaining capacity is less than or equal to the preset capacity, the processor reports the current remaining capacity to the system circuit.

18. The electronic device according to claim 15, wherein the capacity correction process further comprises:

determining whether the battery voltage is greater than a voltage threshold after obtaining the new correction capacity;

determining whether the new correction capacity is less than a capacity threshold in a case of determining that the battery voltage is greater than the voltage threshold;

performing the step of reporting the correction capacity to a system circuit in a case of determining that the new correction capacity is not less than the capacity threshold;

reporting the preset capacity to the system circuit in a case of determining that the new correction capacity is less than the capacity threshold; and reporting the cut-off capacity to the system circuit in a case of determining that the battery voltage is not greater than the voltage threshold.

19. The electronic device according to claim 18, wherein the step of reporting the cut-off capacity to the system circuit is performed after it is continuously recorded that a number of times that the battery voltage is not greater than the voltage threshold reaches a predetermined number of times.

20. The electronic device according to claim 15, wherein the capacity correction process further comprises:

sequentially reading the plurality of remaining capacities;

determining whether the battery voltage is greater than a voltage threshold in a case that the read remaining capacity is the cut-off capacity and the read previous remaining capacity is a virtual capacity;

reporting the cut-off capacity to the system circuit in a case of determining that the battery voltage is not greater than the voltage threshold; and reporting the preset capacity to the system circuit in a case of determining that the battery voltage is greater than the voltage threshold, and returning to the step of determining whether the battery voltage is greater than a voltage threshold;

wherein the step of reporting the cut-off capacity to the system circuit is performed after it is continuously recorded that a number of times that the battery voltage is not greater than the voltage threshold reaches a predetermined number of times.

\* \* \* \* \*